(12) United States Patent
Chen

(10) Patent No.: US 8,525,927 B1
(45) Date of Patent: Sep. 3, 2013

(54) METHOD FOR ENLARGING 4K2K RESOLUTION AND 4K2K RESOLUTION ENLARGING SYSTEM USING SAME

(75) Inventor: Yuyeh Chen, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/698,044

(22) PCT Filed: Sep. 13, 2012

(86) PCT No.: PCT/CN2012/081311
§ 371 (c)(1),
(2), (4) Date: Nov. 14, 2012

(30) Foreign Application Priority Data

Aug. 17, 2012 (CN) .......................... 2012 1 0294771

(51) Int. Cl.
*H04N 7/01* (2006.01)
*H04N 11/20* (2006.01)
(52) U.S. Cl.
USPC ........... 348/441; 348/458; 348/581; 348/790; 345/698; 345/690
(58) Field of Classification Search
USPC ................. 348/441, 458, 581, 790; 345/698, 345/690
See application file for complete search history.

(56) References Cited

U.S. PATENT DOCUMENTS

| | | | |
|---|---|---|---|
| 2011/0037785 A1* | 2/2011 | Shiomi | 345/690 |
| 2011/0187734 A1* | 8/2011 | Yui | 345/589 |
| 2011/0199398 A1* | 8/2011 | Yui | 345/690 |
| 2012/0069894 A1* | 3/2012 | Sakimura et al. | 375/240.02 |
| 2012/0147013 A1* | 6/2012 | Masuda et al. | 345/473 |
| 2012/0281030 A1* | 11/2012 | Miyata | 345/690 |
| 2012/0293618 A1* | 11/2012 | Tsukagoshi | 348/43 |
| 2012/0321194 A1* | 12/2012 | Zhang et al. | 382/190 |

\* cited by examiner

*Primary Examiner* — Jefferey Harold
*Assistant Examiner* — Mustafizur Rahman
(74) *Attorney, Agent, or Firm* — Andrew C. Cheng

(57) ABSTRACT

The present invention provides a method for enlarging 4K2K resolution and a 4K2K resolution enlarging system using the method. The method includes (1) providing a 4K2K resolution enlarging system, which includes a TV control terminal and a timing controller that includes a first port module, a FHD/QFHD signal processing module, 3a D/2D signal processing module, a 4K/2K signal resolution enlarging module, and a second port module connected to a source driver IC; (2) receiving the external data signal and carrying out processing of the data signal to provide an output of FHD/QFHD format data signal to the timing controller; (3) the timing controller carrying out panel-related computation with the FHD/QFHD signal processing module and the 3D/2D signal processing module; and (4) the 4K/2K signal resolution enlarging module carrying out enlargement of 4K2K and supplying an enlarged data signal to the source driver IC.

11 Claims, 5 Drawing Sheets

METHOD FOR ENLARGING 4K2K RESOLUTION AND 4K2K RESOLUTION ENLARGING SYSTEM USING SAME

BACKGROUND OF THE INVENTION

1. Field of the Invention

The present invention relates to the field of flat panel display, and in particular to a method for enlarging 4K2K resolution and a 4K2K resolution enlarging system using same.

2. The Related Arts

Flat panel display (FPD) is referred to a display device of which a glass substrate of front panel of the display is a flat plane, which is different from the traditional cathode ray tube displays that have a curved surface. The currently available flat panel displays include liquid crystal flat panel displays, plasma panel displays, field emission flat panel displays, and electrical luminescence flat panel displays.

The flat panel displays were a popularized technique developed in the middle of the 70s to meet the demand for being thin and compact, less consumption of energy, and versatility. The popularization was first expanded due to the application of monochromatic liquid crystal display panel in calculators and wrist watches. In the 80s, due to the prevalence of small-sized word processing devices and notebook computers, applications of monochromatic and color liquid crystal panels are even more stimulated. In the 90s, due to the development of diversification and enhancement of performance of personal computers, the application of color liquid crystal panels in the field of monitoring device was actually launched.

The development of opto-electronics and semiconductor techniques bring a prosperous expansion of flat panel displays. Among these flat panel displays, the liquid crystal display devices are advantageous in space utilization, low power consumption, being free of radiation, and low electromagnetic interference and are thus the main stream of the market for wide application in living-related electronic products, such as liquid crystal screens of notebook computers and desktop computers and LCD TVs.

Along with the significant expansion of the application of flat panel displays, the size of the flat panel displays is also increasingly enlarged, which leads to lowering of resolution and definition, making the fineness and sharpness of image poor when viewed in a short distance. Consequently, the development of the flat panel displays is now turning to a target of enhancing resolution to provide fully high definition (FHD) having a resolution of four times and even fully high definition with a resolution of eight times. However, the conventional solution of system driving for such a high resolution is to execute, after expansion of 4K2K signals, a panel related algorithm, such as algorithms including local dimming, multi-region override, gamma correction of grey scale brightness curve, frame rate control (FRC). This solution would consume a great amount of hardware resources, leading to an increase of cost, making the product price high, and thus being adverse to the development of large-sized flat panel display market.

SUMMARY OF THE INVENTION

An object of the present invention is to provide a method for enlarging 4K2K resolution, which, while enlarging resolution, saves hardware resources, lowers down the manufacture cost, makes the prices of products using such a method low, and thus is favorable for the development of the large-sized flat panel display market.

Another object of the present invention is to provide a 4K2K resolution enlarging system, which, while providing a high resolution, saves hardware resources, lowers down the manufacture cost, makes the prices of products using such a method low, and thus is favorable for the development of the large-sized flat panel display market.

To achieve the objects, the present invention provides a method for enlarging 4K2K resolution, which comprises the following steps:

Step 1: providing a 4K2K resolution enlarging system, wherein the 4K2K resolution enlarging system comprises: a TV control terminal and a timing controller that is electrically connected by a connection cable to the TV control terminal, the timing controller comprising a first port module, a FHD/QFHD signal processing module electrically connected to the first port module, a 3D/2D signal processing module electrically connected to the FHD/QFHD signal processing module, a 4K/2K signal resolution enlarging module electrically connected to the 3D/2D signal processing module, and a second port module electrically connected to the 4K/2K signal resolution enlarging module, the second port module being for connection with a source driver IC, the TV control terminal being for receiving an external data signal;

Step 2: the TV control terminal receiving the external data signal and carrying out processing of the data signal to provide an output of FHD/QFHD format data signal to the timing controller;

Step 3: the timing controller receiving the data signal through the first port module and carrying out panel-related computation on the data signal with the FHD/QFHD signal processing module and 3D/2D signal processing module and transmitting the processed data signal to the 4K/2K signal resolution enlarging module; and Step 4: the 4K/2K signal resolution enlarging module carrying out enlargement of 4K2K resolution on the received data signal and transmits the enlarged data signal via the second port module to the external source driver IC.

The FHD/QFHD signal processing module comprises a first signal identification module electrically connected to the first port module and a signal compression module electrically connected to the first signal identification module. The 3D/2D signal processing module comprises a second signal identification module electrically connected to the first signal identification module and the signal compression module, a 3D grey scale brightness curve correction module electrically connected to the second signal identification module, a dynamic transition driving computation module electrically connected to the 3D grey scale brightness curve correction module, a local dimming module electrically connected to the second signal identification module, a multi-region override module electrically connected to the local dimming module, and a frame rate control module electrically connected to the dynamic transition driving computation module and the multi-region override module. The frame rate control module is electrically connected to the 4K/2K signal resolution enlarging module.

The connection cable selectively comprises one set of high-speed LVDS cable, two sets of LVDS cable, or four sets of high-speed LVDS cable, respectively providing two-channel, four-channel, or eight-channel transmission.

The connection cable comprises eight sets of Vbyone cables, each set of Vbyone cable comprising two differential lines and two message communication differential lines.

The timing controller is electrically connected by a flexible circuit board to the source driver IC.

The present invention also provides a method for enlarging 4K2K resolution, which comprises the following steps:

Step 1: providing a 4K2K resolution enlarging system, wherein the 4K2K resolution enlarging system comprises: a TV control terminal and a timing controller that is electrically connected by a connection cable to the TV control terminal, the timing controller comprising a first port module, a FHD/QFHD signal processing module electrically connected to the first port module, a 3D/2D signal processing module electrically connected to the FHD/QFHD signal processing module, a 4K/2K signal resolution enlarging module electrically connected to the 3D/2D signal processing module, and a second port module electrically connected to the 4K/2K signal resolution enlarging module, the second port module being for connection with a source driver IC, the TV control terminal being for receiving an external data signal;

Step 2: the TV control terminal receiving the external data signal and carrying out processing of the data signal to provide an output of FHD/QFHD format data signal to the timing controller;

Step 3: the timing controller receiving the data signal through the first port module and carrying out panel-related computation on the data signal with the FHD/QFHD signal processing module and 3D/2D signal processing module and transmitting the processed data signal to the 4K/2K signal resolution enlarging module; and Step 4: the 4K/2K signal resolution enlarging module carrying out enlargement of 4K2K resolution on the received data signal and transmits the enlarged data signal via the second port module to the external source driver IC;

wherein the FHD/QFHD signal processing module comprises a first signal identification module electrically connected to the first port module and a signal compression module electrically connected to the first signal identification module, the 3D/2D signal processing module comprising a second signal identification module electrically connected to the first signal identification module and the signal compression module, a 3D grey scale brightness curve correction module electrically connected to the second signal identification module, a dynamic transition driving computation module electrically connected to the 3D grey scale brightness curve correction module, a local dimming module electrically connected to the second signal identification module, a multi-region override module electrically connected to the local dimming module, and a frame rate control module electrically connected to the dynamic transition driving computation module and the multi-region override module, the frame rate control module being electrically connected to the 4K/2K signal resolution enlarging module;

wherein the connection cable selectively comprises one set of high-speed LVDS cable, two sets of LVDS cable, or four sets of high-speed LVDS cable, respectively providing two-channel, four-channel, or eight-channel transmission; and wherein the timing controller is electrically connected by a flexible circuit board to the source driver IC.

The present invention also provides a 4K2K resolution enlarging system, which comprises a TV control terminal and a timing controller that is electrically connected by a connection cable to the TV control terminal. The timing controller comprises a first port module, a FHD/QFHD signal processing module electrically connected to the first port module, a 3D/2D signal processing module electrically connected to the FHD/QFHD signal processing module, a 4K/2K signal resolution enlarging module electrically connected to the 3D/2D signal processing module, and a second port module electrically connected to the 4K/2K signal resolution enlarging module. The second port module is for connection with a source driver IC.

The FHD/QFHD signal processing module comprises a first signal identification module electrically connected to the first port module and a signal compression module electrically connected to the first signal identification module. The 3D/2D signal processing module comprises a second signal identification module electrically connected to the first signal identification module and the signal compression module, a 3D grey scale brightness curve correction module electrically connected to the second signal identification module, a dynamic transition driving computation module electrically connected to the 3D grey scale brightness curve correction module, a local dimming module electrically connected to the second signal identification module, a multi-region override module electrically connected to the local dimming module, and a frame rate control module electrically connected to the dynamic transition driving computation module and the multi-region override module. The frame rate control module is electrically connected to the 4K/2K signal resolution enlarging module.

The connection cable selectively comprises one set of high-speed LVDS cable, two sets of LVDS cable, or four sets of high-speed LVDS cable, respectively providing two-channel, four-channel, or eight-channel transmission.

The connection cable comprises eight sets of Vbyone cables, each set of Vbyone cable comprising two differential lines and two message communication differential lines.

The timing controller is electrically connected by a flexible circuit board to the source driver IC.

The efficacy of the present invention is that the present invention provides a method for enlarging 4K2K resolution, which first carries out panel-related computation with a 3D/2D signal processing module and then performs enlargement of 4K2K resolution, whereby the method, while enlarging resolution, saves hardware resources, lowers down the manufacture cost, makes the prices of products using such a method low, and is thus favorable for the development of the large-sized flat panel display market. While providing a high resolution, the 4K2K resolution enlarging system according to the present invention saves hardware resources, lowers down the manufacture cost, makes the prices of products using such a method low, and is thus favorable for the development of the large-sized flat panel display market.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
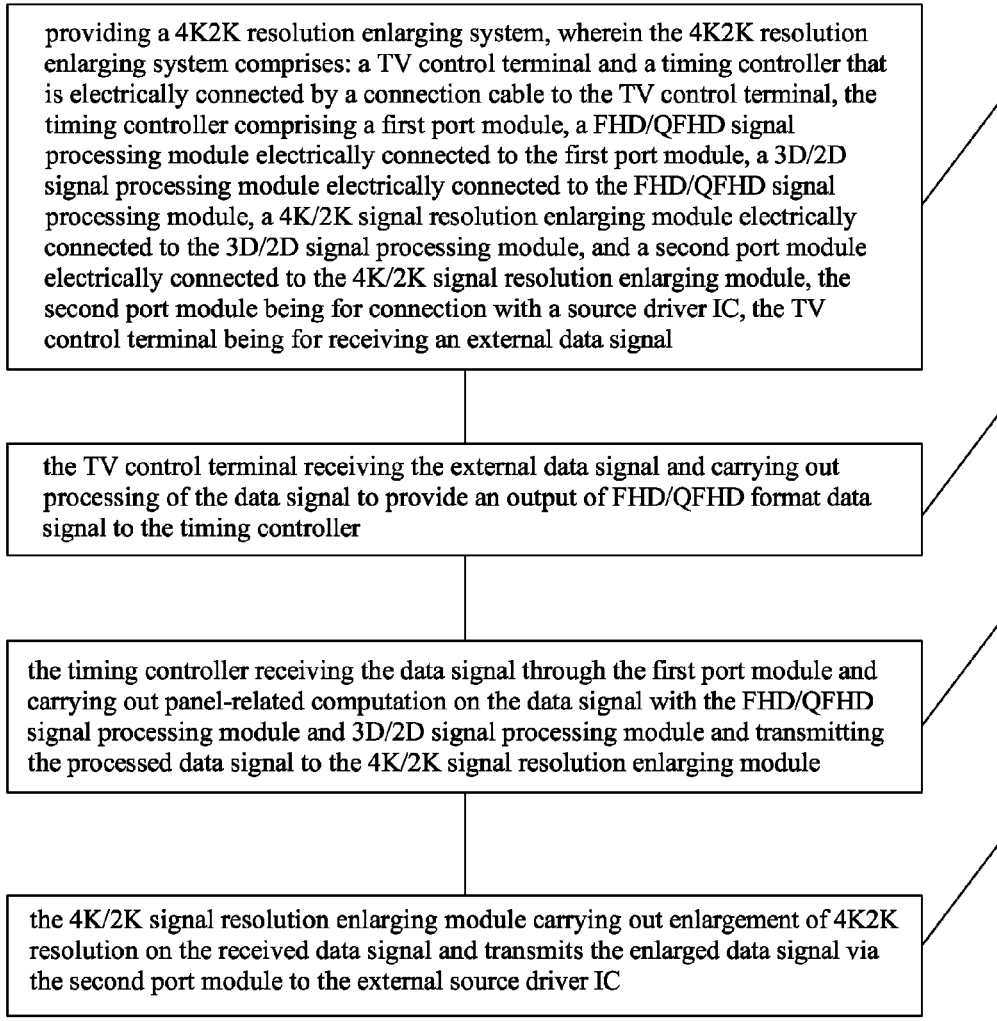
FIG. 1 is a flow chart illustrating a method for enlarging 4K2K resolution according to the present invention.
Figure 2:
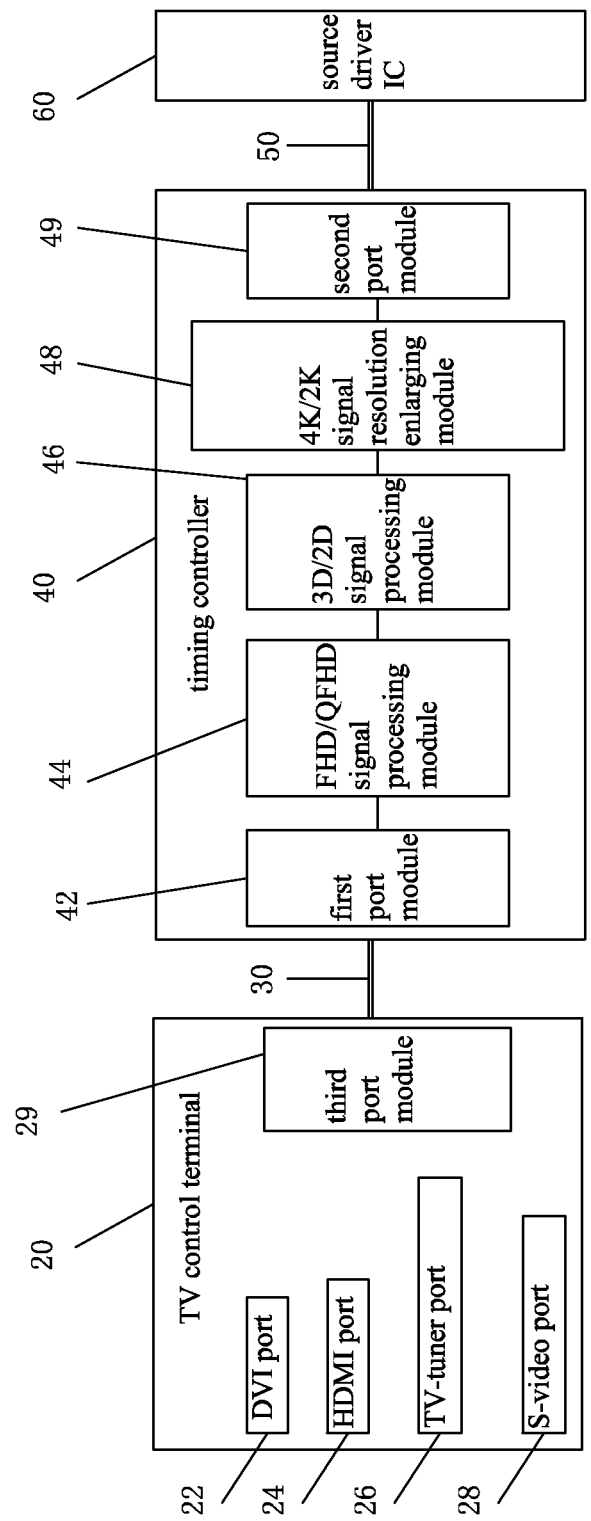
FIG. 2 is a block diagram of a 4K2K resolution enlarging system.
Figure 3:
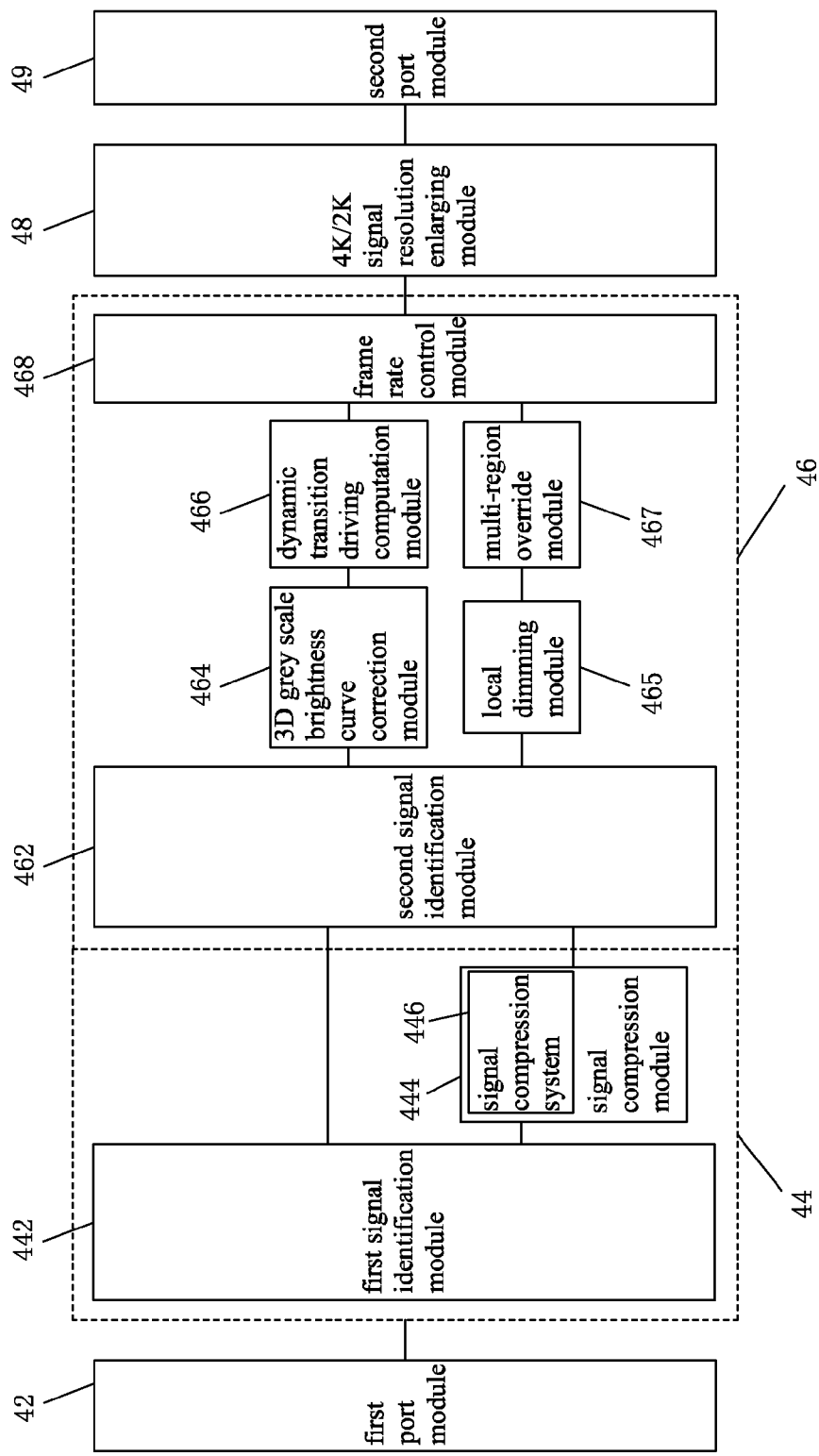
FIG. 3 is a block diagram of a timing controller of FIG. 2.

Referring to FIGS. 1-3, the present invention provides a method for enlarging 4K2K resolution, which comprises the following steps:

Step 1: providing a 4K2K resolution enlarging system, wherein the 4K2K resolution enlarging system comprises: a TV control terminal 20 and a timing controller 40 that is electrically connected by a connection cable 30 to the TV control terminal 20. The timing controller 40 comprises a first port module 42, a FHD/QFHD signal processing module 44 electrically connected to the first port module 42, a 3D/2D signal processing module 46 electrically connected to the FHD/QFHD signal processing module 44, a 4K/2K signal resolution enlarging module 48 electrically connected to the 3D/2D signal processing module 46, and a second port module 49 electrically connected to the 4K/2K signal resolution enlarging module 48. The second port module 49 is provided for connection with a source driver IC 60. The TV control terminal 20 is provided for receiving an external data signal.

The FHD/QFHD signal processing module 44 comprises a first signal identification module 442 electrically connected to the first port module 42 and a signal compression module 444 electrically connected to the first signal identification module 442. The signal compression module 444 comprises a signal compression system 446. The signal compression system 446 is capable of DDRI compression of a QFHD signal (which has a resolution that is four times of FHD).

The 3D/2D signal processing module 46 comprises a second signal identification module 462 electrically connected to the first signal identification module 442 and the signal compression module 444, a 3D grey scale brightness curve correction module 464 electrically connected to the second signal identification module 462, a dynamic transition driving computation module 466 electrically connected to the 3D grey scale brightness curve correction module 464, a local dimming module 465 electrically connected to the second signal identification module 462, a multi-region override module 467 electrically connected to the local dimming module 465, and a frame rate control module 468 electrically connected to the dynamic transition driving computation module 466 and the multi-region override module 467. The frame rate control module 468 is electrically connected to the 4K/2K signal resolution enlarging module 48. The 3D grey scale brightness curve correction module 464 and the dynamic transition driving computation module 466 function to process a 3D signal, while the local dimming module 465 and the multi-region override module 467 function to process a 2D signal.

In the instant preferred embodiment, the connection cable 30 comprises one set of high-speed LVDS (Low-Voltage Differential Signaling) cable providing two-channel transmission and each of the channels has a clock rate between 75 MHz-150 MHz, but not limited thereto. The connection cable 30 can be of two sets of LVDS cable, providing four-channel transmission. The timing controller 40 is electrically connected by a flexible circuit board 50 to the source driver IC 60.

Step 2: the TV control terminal 20 receiving the external data signal and carrying out processing of the data signal to provide an output of FHD/QFHD format data signal to the timing controller 40.

The TV control terminal 20 comprises a third port module 29, a DVI port 22, an HDMI port 24, a TV-tuner port 26, and an S-video port 28. The third port module 29 is electrically connected to the connection cable 30 so as to electrically connect the TV control terminal 20 to the timing controller 40. The TV control terminal 20 comprises various functions, including: a screen menu type adjustable displaying function, a size and location adjusting function, a motion estimation and motion compensation function, a brightness adjusting function, and a color saturation adjusting function. These functions are selectable and adjustable through buttons mounted on a display enclosure (not shown). In Step 2, the above functions can be used to process data signal according to the setting made by a user.

Step 3: the timing controller 40 receiving the data signal through the first port module 42 and carrying out panel-related computation on the data signal with the FHD/QFHD signal processing module 44 and 3D/2D signal processing module 46 and transmitting the processed data signal to the 4K/2K signal resolution enlarging module 48.

The first signal identification module 442, after receiving the signal from the TV control terminal 20 through the first port module 42, carries out identification operation on the signal, whereby if the signal is an FHD format signal, then the signal is directly transmitted to the second signal identification module 462 for further identification and if the signal is a QFHD format signal, then the signal is transmitted to the signal compression module 444 so as to subject the QFHD format signal to DDRI compression with the signal compression module 444 and to further transmit the signal to the second signal identification module 462 for further identification. the second signal identification module 462 carries out an identification operation on the signal received and if the signal is a 3D signal, then the signal is transmitted to the 3D grey scale brightness curve correction module 464 for 3D grey scale brightness curve correction with the 3D grey scale brightness curve correction module 464 and for dynamic transition driving computation with the dynamic transition driving computation module 466, the signal being then transmitted to the frame rate control module 468; and if the signal is a 2D signal, then the signal is transmitted to the local dimming module 465 for localized backlighting with the local dimming module 465 and for multi-region override processing with the multi-region override module 467, the signal being then transmitted to the frame rate control module 468. The frame rate control module 468, after carrying out processing, transmits the signal to the 4K/2K signal resolution enlarging module 48.

Step 4: the 4K/2K signal resolution enlarging module 48 carrying out enlargement of 4K2K resolution on the received data signal and transmits the enlarged data signal via the second port module 49 to the external source driver IC 60.

The method for enlarging 4K2K resolution according to the present invention first carries out panel-related computation with the QFHD signal processing module 44 and 3D/2D signal processing module 46 of the timing controller and then carries out resolution enlargement with the 4K/2K signal resolution enlarging module 48 to thereby achieve high resolution while save hardware resources and reduce manufacture cost.

It is noted that in the present method, signal transmission is done with LVDS technique. Through extremely low voltage amplitude high speed differential transmission of data, it is possible to realize point-to-point or one point to multiple point connection with advantages of low power consumption, low bit error rate, low cross-talking, and low radiation and may well meet the demands for signal integrity, low jitter, and common mode characteristics.

Figure 4:
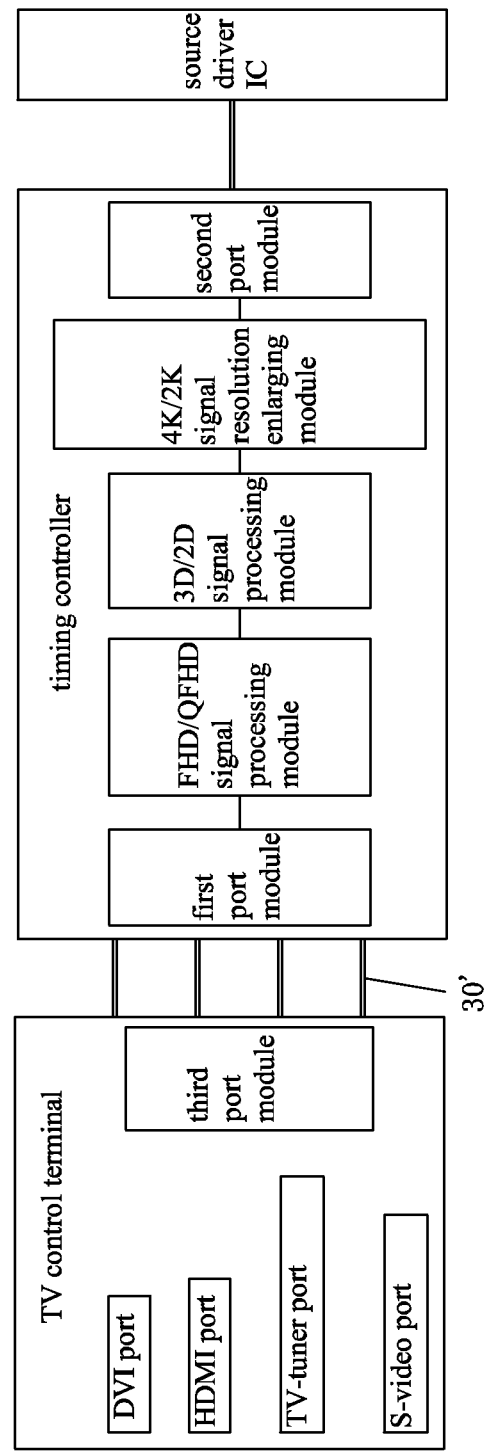
FIG. 4 is a block diagram of a 4K2K resolution enlarging system according to another preferred embodiment.

Referring to FIG. 4, as an alternative preferred embodiment, the connection cable 30' comprises four sets of high-speed LVDS cable, providing 8 channels, with the channel clock rate being around 400 MHz. Through expanding the number of sets of LVDS connection cable, it is possible to achieve straight-through compatible 4K2K resolution Referring to FIG. 5, as another alternative preferred embodiment, the connection cable 30" comprises 8 sets of Vbyone cable. Each set of Vbyone cable comprises two differential lines and message communication differential line. Through replacing 4 sets of LVDS cable with 8 sets of Vbyone cable, the amount of transmission lines used can be effectively lowered, allowing good design of wiring on a printed circuit board, and providing straight-through compatible 4K2K resolution.

Referring to FIGS. 2 and 3, the present invention also provides a 4K2K resolution enlarging system, which comprises: a TV control terminal 20 and a timing controller 40 that is electrically connected by a connection cable 30 to the TV control terminal 20. The timing controller 40 comprises a first port module 42, a FHD/QFHD signal processing module 44 electrically connected to the first port module 42, a 3D/2D signal processing module 46 electrically connected to the FHD/QFHD signal processing module 44, a 4K/2K signal resolution enlarging module 48 electrically connected to the 3D/2D signal processing module 46, and a second port module 49 electrically connected to the 4K/2K signal resolution enlarging module 48. The second port module 49 is provided for connection with a source driver IC 60. Panel-related computations are first carried out with the FHD/QFHD signal processing module 44 and the 3D/2D signal processing module 46 of the timing controller 40 and then, resolution enlargement is carried out with the 4K/2K signal resolution enlarging module 48 to thereby achieve high resolution while save hardware resources and reduce manufacture cost.

The FHD/QFHD signal processing module 44 comprises a first signal identification module 442 electrically connected to the first port module 42 and a signal compression module 444 electrically connected to the first signal identification module 442. The signal compression module 444 comprises a signal compression system 446. DDRI compression of QFHD signal can be done with the signal compression system 446.

The 3D/2D signal processing module 46 comprises a second signal identification module 462 electrically connected to the first signal identification module 442 and the signal compression module 444, a 3D grey scale brightness curve correction module 464 electrically connected to the second signal identification module 462, a dynamic transition driving computation module 466 electrically connected to the 3D grey scale brightness curve correction module 464, a local dimming module 465 electrically connected to the second signal identification module 462, a multi-region override module 467 electrically connected to the local dimming module 465, and a frame rate control module 468 electrically connected to the dynamic transition driving computation module 466 and the multi-region override module 467. The frame rate control module 468 is electrically connected to the 4K/2K signal resolution enlarging module 48. The 3D grey scale brightness curve correction module 464 and the dynamic transition driving computation module 466 function to process a 3D signal, while the local dimming module 465 and the multi-region override module 467 function to process a 2D signal.

The operation flow of the timing controller 40 is as follows. The first signal identification module 442, after receiving the signal from the TV control terminal 20 through the first port module 42, carries out identification operation on the signal, whereby if the signal is an FHD format signal, then the signal is directly transmitted to the second signal identification module 462 for further identification and if the signal is a QFHD format signal, then the signal is transmitted to the signal compression module 444 so as to subject the QFHD format signal to DDRI compression with the signal compression module 444 and to further transmit the signal to the second signal identification module 462 for further identification. the second signal identification module 462 carries out an identification operation on the signal received and if the signal is a 3D signal, then the signal is transmitted to the 3D grey scale brightness curve correction module 464 for 3D grey scale brightness curve correction with the 3D grey scale brightness curve correction module 464 and for dynamic transition driving computation with the dynamic transition driving computation module 466, the signal being then transmitted to the frame rate control module 468; and if the signal is a 2D signal, then the signal is transmitted to the local dimming module 465 for localized backlighting with the local dimming module 465 and for multi-region override processing with the multi-region override module 467, the signal being then transmitted to the frame rate control module 468. The frame rate control module 468, after carrying out processing, transmits the signal to the 4K/2K signal resolution enlarging module 48 for enlargement of resolution.

The TV control terminal 20 comprises a third port module 29, a DVI port 22, an HDMI port 24, a TV-tuner port 26, and an S-video port 28. The third port module 29 is electrically connected to the connection cable 30 so as to electrically connect the TV control terminal 20 to the timing controller 40. The TV control terminal 20 comprises various functions, including: a screen menu type adjustable displaying function, a size and location adjusting function, a motion estimation and motion compensation function, a brightness adjusting function, and a color saturation adjusting function. These functions are adjustable through buttons mounted on a display enclosure (not shown).

In the instant preferred embodiment, the connection cable 30 comprises one set of high-speed LVDS (Low-Voltage Differential Signaling) cable providing two-channel transmission and each of the channels has a clock rate between 75 MHz-150 MHz, but not limited thereto. The connection cable 30 can be of two sets of LVDS cable, providing four-channel transmission.

The timing controller 40 is electrically connected by a flexible circuit board 50 to the source driver IC 60, forming a high speed transmission interface (P2P).

The specific operation flow is as follows. The TV control terminal 20 supplies a processed 3D/2D image signal through the LVDS connection cable 30 to the timing controller 40. The FHD/QFHD signal processing module 44 and 3D/2D signal processing module 46, after carrying out panel-related computation, transmit the 3D/2D image signal to the 4K/2K signal resolution enlarging module 48 for enlargement of resolution. Afterwards, the 3D/2D image signal is transmitted through the flexible circuit board 50 to the source driver IC 60.

It is noted that in the present system, signal transmission is done with LVDS technique. Through extremely low voltage amplitude high speed differential transmission of data, it is possible to realize point-to-point or one point to multiple point connection with advantages of low power consumption, low bit error rate, low cross-talking, and low radiation and may well meet the demands for signal integrity, low jitter, and common mode characteristics.

Panel-related computations are first carried out and then the enlargement of 4K2K resolution is made to thereby achieve high resolution while save hardware resources and reduce manufacture cost and provide a low cost high resolution solution for displays.

Referring to FIG. 4, as an alternative preferred embodiment, the connection cable 30' comprises four sets of high-speed LVDS cable, providing 8 channels, with the channel clock rate being around 400 MHz. Through expanding the number of sets of LVDS connection cable, it is possible to achieve straight-through compatible 4K2K resolution.

Figure 5:
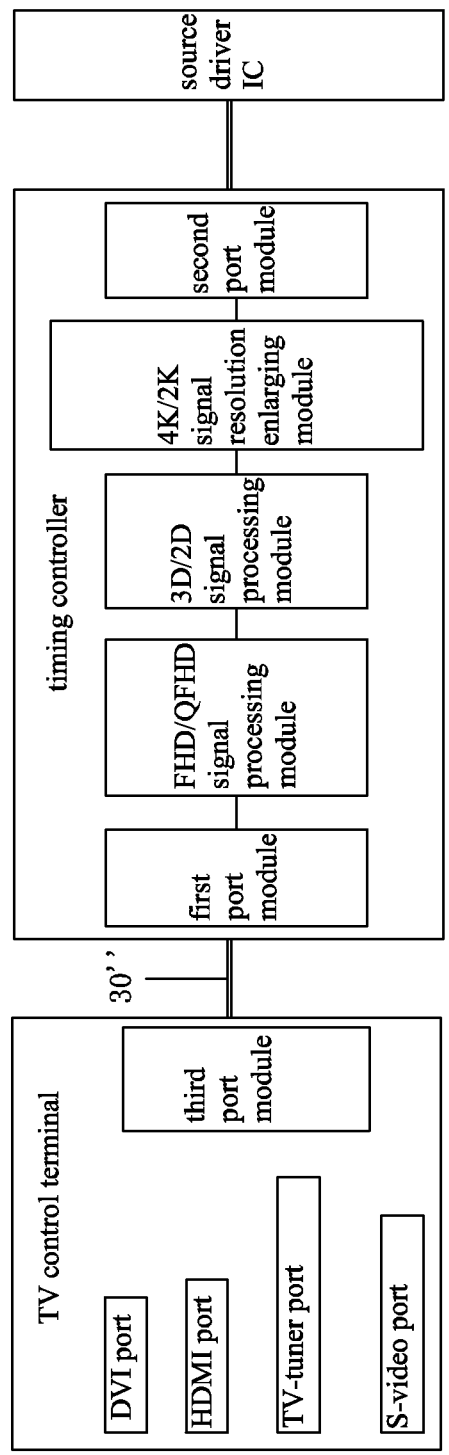
FIG. 5 is a block diagram of a 4K2K resolution enlarging system according to a further preferred embodiment.

Referring to FIG. 5, as another alternative preferred embodiment, the connection cable 30" comprises 8 sets of Vbyone cable. Each set of Vbyone cable comprises two differential lines and message communication differential line. Through replacing 4 sets of LVDS cable with 8 sets of Vbyone cable, the amount of transmission lines used can be effectively lowered, allowing good design of wiring on a printed circuit board, and providing straight-through compatible 4K2K resolution.

In summary, the present invention provides a method for enlarging 4K2K resolution, which first carries out panel-related computation with a 3D/2D signal processing module and then performs enlargement of 4K2K resolution, whereby the method, while enlarging resolution, saves hardware resources, lowers down the manufacture cost, makes the prices of products using such a method low, and is thus favorable for the development of the large-sized flat panel display market. The present invention also provides a 4K2K resolution enlarging system, which system, while providing a high resolution, saves hardware resources, lowers down the manufacture cost, makes the prices of products using such a method low, and is thus favorable for the development of the large-sized flat panel display market.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for enlarging 4K2K resolution, comprising the following steps:
   (1) providing a 4K2K resolution enlarging system, wherein the 4K2K resolution enlarging system comprises: a TV control terminal and a timing controller that is electrically connected by a connection cable to the TV control terminal, the timing controller comprising a first port module, a FHD/QFHD signal processing module electrically connected to the first port module, a 3D/2D signal processing module electrically connected to the FHD/QFHD signal processing module, a 4K/2K signal resolution enlarging module electrically connected to the 3D/2D signal processing module, and a second port module electrically connected to the 4K/2K signal resolution enlarging module, the second port module being for connection with a source driver IC, the TV control terminal being for receiving an external data signal;
   (2) the TV control terminal receiving the external data signal and carrying out processing of the data signal to provide an output of FHD/QFHD format data signal to the timing controller;
   (3) the timing controller receiving the data signal through the first port module and carrying out panel-related computation on the data signal with the FHD/QFHD signal processing module and 3D/2D signal processing module and transmitting the processed data signal to the 4K/2K signal resolution enlarging module; and
   (4) the 4K/2K signal resolution enlarging module carrying out enlargement of 4K2K resolution on the received data signal and transmits the enlarged data signal via the second port module to the external source driver IC.

2. The method for enlarging 4K2K resolution as claimed in claim 1, wherein the FHD/QFHD signal processing module comprises a first signal identification module electrically connected to the first port module and a signal compression module electrically connected to the first signal identification module, the 3D/2D signal processing module comprising a second signal identification module electrically connected to the first signal identification module and the signal compression module, a 3D grey scale brightness curve correction module electrically connected to the second signal identification module, a dynamic transition driving computation module electrically connected to the 3D grey scale brightness curve correction module, a local dimming module electrically connected to the second signal identification module, a multi-region override module electrically connected to the local dimming module, and a frame rate control module electrically connected to the dynamic transition driving computation module and the multi-region override module, the frame rate control module being electrically connected to the 4K/2K signal resolution enlarging module.

3. The method for enlarging 4K2K resolution as claimed in claim 1, wherein the connection cable selectively comprises one set of high-speed LVDS cable, two sets of LVDS cable, or four sets of high-speed LVDS cable, respectively providing two-channel, four-channel, or eight-channel transmission.

4. The method for enlarging 4K2K resolution as claimed in claim 1, wherein the connection cable comprises eight sets of Vbyone cables, each set of Vbyone cable comprising two differential lines and two message communication differential lines.

5. The method for enlarging 4K2K resolution as claimed in claim 1, wherein the timing controller is electrically connected by a flexible circuit board to the source driver IC.

6. A method for enlarging 4K2K resolution, comprising the following steps:
   (1) providing a 4K2K resolution enlarging system, wherein the 4K2K resolution enlarging system comprises: a TV control terminal and a timing controller that is electrically connected by a connection cable to the TV control terminal, the timing controller comprising a first port module, a FHD/QFHD signal processing module electrically connected to the first port module, a 3D/2D signal processing module electrically connected to the FHD/QFHD signal processing module, a 4K/2K signal resolution enlarging module electrically connected to the 3D/2D signal processing module, and a second port module electrically connected to the 4K/2K signal resolution enlarging module, the second port module being for connection with a source driver IC, the TV control terminal being for receiving an external data signal;
   (2) the TV control terminal receiving the external data signal and carrying out processing of the data signal to provide an output of FHD/QFHD format data signal to the timing controller;
   (3) the timing controller receiving the data signal through the first port module and carrying out panel-related computation on the data signal with the FHD/QFHD signal processing module and 3D/2D signal processing module and transmitting the processed data signal to the 4K/2K signal resolution enlarging module; and
   (4) the 4K/2K signal resolution enlarging module carrying out enlargement of 4K2K resolution on the received data signal and transmits the enlarged data signal via the second port module to the external source driver IC;
   wherein the FHD/QFHD signal processing module comprises a first signal identification module electrically connected to the first port module and a signal compression module electrically connected to the first signal identification module, the 3D/2D signal processing module comprising a second signal identification module electrically connected to the first signal identification module and the signal compression module, a 3D grey scale brightness curve correction module electrically connected to the second signal identification module, a dynamic transition driving computation module electrically connected to the 3D grey scale brightness curve correction module, a local dimming module electrically connected to the second signal identification module, a multi-region override module electrically connected to the local dimming module, and a frame rate control module electrically connected to the dynamic transition driving computation module and the multi-region override module, the frame rate control module being electrically connected to the 4K/2K signal resolution enlarging module;

wherein the connection cable selectively comprises one set of high-speed LVDS cable, two sets of LVDS cable, or four sets of high-speed LVDS cable, respectively providing two-channel, four-channel, or eight-channel transmission; and wherein the timing controller is electrically connected by a flexible circuit board to the source driver IC.

7. A 4K2K resolution enlarging system, comprising a TV control terminal and a timing controller that is electrically connected by a connection cable to the TV control terminal, the timing controller comprising a first port module, a FHD/QFHD signal processing module electrically connected to the first port module, a 3D/2D signal processing module electrically connected to the FHD/QFHD signal processing module, a 4K/2K signal resolution enlarging module electrically connected to the 3D/2D signal processing module, and a second port module electrically connected to the 4K/2K signal resolution enlarging module, the second port module being for connection with a source driver IC.

8. The 4K2K resolution enlarging system as claimed in claim 7, wherein the FHD/QFHD signal processing module comprises a first signal identification module electrically connected to the first port module and a signal compression module electrically connected to the first signal identification module, the 3D/2D signal processing module comprising a second signal identification module electrically connected to the first signal identification module and the signal compression module, a 3D grey scale brightness curve correction module electrically connected to the second signal identification module, a dynamic transition driving computation module electrically connected to the 3D grey scale brightness curve correction module, a local dimming module electrically connected to the second signal identification module, a multi-region override module electrically connected to the local dimming module, and a frame rate control module electrically connected to the dynamic transition driving computation module and the multi-region override module, the frame rate control module being electrically connected to the 4K/2K signal resolution enlarging module.

9. The 4K2K resolution enlarging system as claimed in claim 7, wherein the connection cable selectively comprises one set of high-speed LVDS cable, two sets of LVDS cable, or four sets of high-speed LVDS cable, respectively providing two-channel, four-channel, or eight-channel transmission.

10. The 4K2K resolution enlarging system as claimed in claim 7, wherein the connection cable comprises eight sets of Vbyone cables, each set of Vbyone cable comprising two differential lines and two message communication differential lines.

11. The 4K2K resolution enlarging system as claimed in claim 7, wherein the timing controller is electrically connected by a flexible circuit board to the source driver IC.

\* \* \* \* \*